United States Patent
Munihanumaiah et al.

(10) Patent No.: US 10,218,573 B2
(45) Date of Patent: Feb. 26, 2019

(54) SYSTEM AND METHOD FOR DISCOVERING CONFIGURATIONS OF LEGACY CONTROL SYSTEMS

(71) Applicant: Honeywell International Inc., Morris Plains, NJ (US)

(72) Inventors: Shylaja Munihanumaiah, Bangalore (IN); Ramakrishnan Ganapathi, Bangalore (IN); Abhishek Nikhra, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 256 days.

(21) Appl. No.: 15/226,856

(22) Filed: Aug. 2, 2016

(65) Prior Publication Data

US 2018/0041393 A1 Feb. 8, 2018

(51) Int. Cl.
*H04L 12/24* (2006.01)
*H04L 29/08* (2006.01)

(52) U.S. Cl.
CPC .......... *H04L 41/0866* (2013.01); *H04L 67/02* (2013.01); *H04L 67/12* (2013.01); *H04L 41/12* (2013.01)

(58) Field of Classification Search
CPC ..... H04L 41/0866; H04L 41/12; H04L 67/02; H04L 67/12
See application file for complete search history.

(56) References Cited

U.S. PATENT DOCUMENTS

| | | | |
|---|---|---|---|
| 6,654,950 B1 | 11/2003 | Barnishan | |
| 8,407,675 B1 | 3/2013 | Clark | |
| 8,825,183 B2 * | 9/2014 | Hammack | G05B 19/409 700/17 |
| 9,871,814 B2 * | 1/2018 | Seigel | H04L 63/1433 |
| 9,964,938 B2 * | 5/2018 | Washiro | G05B 19/0426 |
| 2006/0184922 A1 | 8/2006 | Vera | |
| 2009/0292995 A1 * | 11/2009 | Anne | H04L 12/413 715/736 |

(Continued)

FOREIGN PATENT DOCUMENTS

WO    2008061557 A1    5/2008

OTHER PUBLICATIONS

International Search Report and Written Opinion of the International Searching Authority for PCT Patent Application No. PCT/US2017/043119 dated Oct. 16, 2017, 12 pages.

*Primary Examiner* — Viet D Vu

(57) ABSTRACT

A system includes at least one processor configured to identify multiple nodes coupled to at least one network of an industrial plant, obtain configuration data from each of the nodes, parse the configuration data to extract specified information from the configuration data, and store the extracted specified information in a specified format. To parse the configuration data for each node, the at least one processor may be configured to generate a memory layout for the configuration data from the node, open a checkpoint file containing the configuration data from the node, and identify at least one point and header information for the at least one point in the checkpoint file using the memory layout. To identify the multiple nodes, the at least one processor can be configured to generate a network diagram of the nodes coupled to the at least one network and identify the nodes from the network diagram.

20 Claims, 6 Drawing Sheets

(56) References Cited

U.S. PATENT DOCUMENTS

| | | |
|---|---|---|
| 2011/0060427 A1 | 3/2011 | Batke et al. |
| 2013/0191106 A1 | 7/2013 | Kephart et al. |
| 2015/0066162 A1* | 3/2015 | Hokeness .......... G05B 19/0426 700/28 |
| 2016/0132037 A1 | 5/2016 | Weng et al. |
| 2016/0299497 A1 | 10/2016 | McLaughlin et al. |

* cited by examiner

SYSTEM AND METHOD FOR DISCOVERING CONFIGURATIONS OF LEGACY CONTROL SYSTEMS

TECHNICAL FIELD

This disclosure relates generally to industrial process control and automation systems. More specifically, this disclosure relates to systems and methods for discovering configurations of legacy control systems.

BACKGROUND

Industrial plants typically include distributed control systems (DCSs), programmable logic controllers (PLCs), safety systems, and other devices from various vendors. Each of these systems or devices can include or be associated with configuration data. The configuration data can be stored in a variety of file formats, such as simple text or structured binary or binary proprietary. The structure of configuration data can vary depending on the release of software running on the systems or devices.

In control systems, configuration data may generally not be available in an information system or database. Compact collection of such data may be important for high performance of a data collection system in order to document the configuration data accurately. In its absence, a system may be inaccurate or low-performing, or the system may have restrictions in supporting various software releases for some systems or devices. A typical data collection operation using checkpoint files versus a derived text file, like an Exception Build (EB) file used in a legacy system from HONEYWELL, can reduce the duration of operations from several days to less than a few hours, thereby reducing the impact on the performance of a legacy control system.

The need for visibility into configuration data can also arise when there is a proposal to move from one controller to another controller with a short time period allowed for re-engineering. Allowing the import of known configuration data onto the new controller could reduce or eliminate the need for reconfiguration of the strategies employed by the previous controller. This can help to expedite the engineering work, many times reducing the engineering work to qualification only if variances in control functions across the controllers are small.

SUMMARY

This disclosure provides systems and methods for discovering configurations of legacy control systems.

In a first embodiment, a system includes at least one processor configured to identify multiple nodes coupled to at least one network of an industrial plant, obtain configuration data from each of the nodes, parse the configuration data to extract specified information from the configuration data, and store the extracted specified information in a specified format.

In a second embodiment, a method includes identifying multiple nodes coupled to at least one network of an industrial plant and obtaining configuration data from each of the nodes. The method also includes parsing the configuration data to extract specified information from the configuration data and storing the extracted specified information in a specified format.

In a third embodiment, a non-transitory computer readable medium contains instructions that, when executed by at least one processing device, cause the at least one processing device to identify multiple nodes coupled to at least one network of an industrial plant and obtain configuration data from each of the nodes. The medium also contains instructions that, when executed by the at least one processing device, cause the at least one processing device to parse the configuration data to extract specified information from the configuration data and store the extracted specified information in a specified format.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 8, discussed below, and the various embodiments used to describe the principles of the present invention in this patent document are by way of illustration and should not be construed in any way to limit the scope of the invention. Those skilled in the art will understand that the principles of the disclosure may be implemented in any type of suitably arranged device or system.

Industrial plants often include legacy controllers, referring to controllers that have been used in the industrial plants for prolonged periods of time. This is because some controllers can have long operational lifespans, such as 15 years or more. Complete configuration data for legacy controllers may not be available in an industrial plant, such as when a legacy controller stores configuration data in binary format but text output from the legacy controller does not provide all information available in the binary format. As a result, a typical study of the configuration data may not be possible because the configuration data may change over time, such as due to unexpected operations during a migration, upgrade, or translation of data.

This disclosure provides systems and methods for discovering configurations of legacy control systems. More specifically, this disclosure provides systems and methods for binary data extraction of legacy controllers into a readable format that may be used by service applications. Extracting and converting the binary data into a readable format can help to provide users with a complete plant configuration, connection details between nodes and any third-party interfaces, and a comprehensive report of plant configurations and interfaces. This can enable easier identification of issues with plant systems and expedite engineering work while reducing impacts on the system. The systems and methods can also utilize checkpoints created with multiple releases of software and can reduce or eliminate frequent updates/upgrades for the same purpose.

Figure 1:
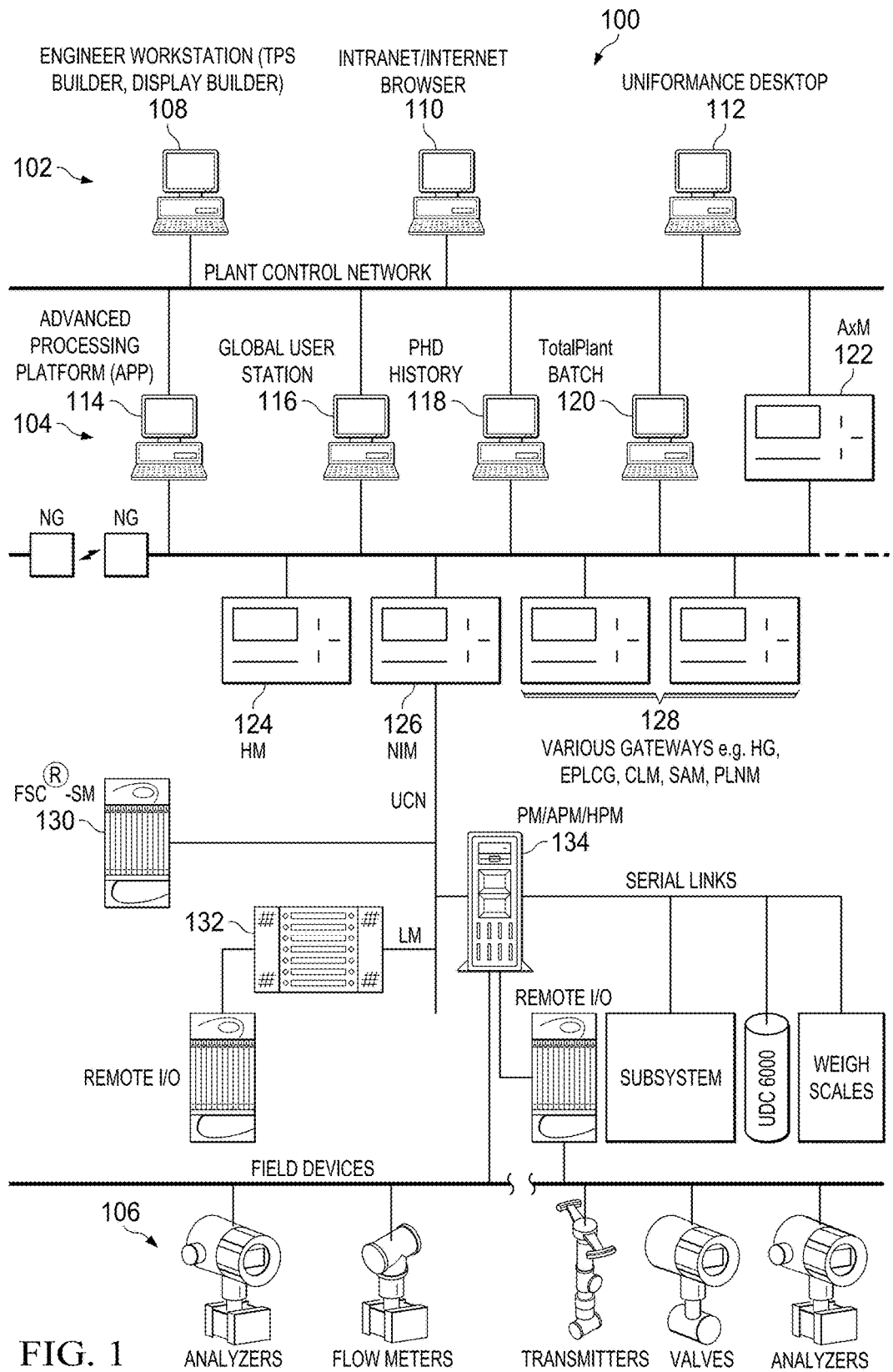
FIG. 1 illustrates an example total plant solution (TPS) system according to this disclosure.

FIG. 1 illustrates an example total plant solution (TPS) system 100 according to this disclosure. As shown in FIG. 1, the system 100 includes at least one plant control network (PCN) 102, at least one local control network (LCN) network 104, and multiple field devices 106. The field devices 106 could include components such as analyzers, flow meters, transmitters, or valves. The PCN 102 may include engineer workstations 108, Intranet/Internet browsers 110, and computers 112. Each of the engineer workstations 108, Intranet/Internet browsers 110, and computers 112 may represent a TPS client node or a TPS server node, each of which is a structure configured to host one or more TPS client applications, one or more TPS server applications, or both. Client applications that may run on an advanced processing platform (APP) may also be executed on a TPS client node or TPS server node, and the client applications on the TPS node could connect to the APP to receive data from the LCN network 104.

The LCN network 104 includes various nodes 114-134 supporting different functions within the system 100. For example, the nodes 114-134 may represent equipment that communicates with devices in the PCN 102 or with field devices 106 in any suitable manner. The nodes 114-134 could communicate with other components in a wired manner, such as via one or more ETHERNET, coaxial LCN/UCN, or Fault Tolerant Ethernet (FTE) networks. In this example, the nodes include at least one APP 114, GUS 116, process history database (PHD) 118, batch application 120, application module (AM) 122, and history module (HM) 124. The nodes include at least one network interface module (NIM) 126 to at least one universal control network (UCN). The nodes further include at least one gateway 128, fail-safe controller 130, logic manager 132, and process manager 134.

The APP 114 represents a TPS node that may provide a platform for advanced control applications. For example, the APP 114 may contain TPS infrastructure components for communicating with the LCN network 104 and other nodes on the LCN network 104. The APP 114 may also provide functions such as TPS status display, TPS configuration, file transfer, and TPS dynamic data exchange (TPSDDE) server functions.

The GUS 116 represents a TPS node that may provide a user interface, such as a graphical user interface (GUI), which includes operating and engineering displays in one or more window of the GUS 116. The GUS 116 may be used by a user to monitor and control processes, TPS components, and applications of the industrial plant. The GUS 116 may also provide historical trending data from the PHD 118 or historian 124.

The PHD 118 represents a plant-wide historian that includes a database for storing or historizing time-based or other data regarding one or more TPS nodes. The PHD 118 may provide data imaging of the TPS nodes, including calculated and user-defined values. Any suitable information could be stored in the PHD 118. The PHD 118 also permits users or other applications, such as the APP 114 or GUS 116, to access the data in order to perform various functions. The PHD 118 denotes any suitable structure facilitating the storage and retrieval of data.

As will be discussed below, various devices in the system 100 (such as the nodes 108-134) may use checkpoint files or other files to store configuration data. The systems and methods described below can be used to access this configuration data and discover the configurations of the nodes 108-134 (which can represent legacy control devices within the system 100).

As a result, the nodes 108-134 do not need a separate utility to generate a list of configuration data. Thus, the resources (computing and otherwise) needed to generate such a listing and to parse the resultant files may be eliminated in these nodes. This can help to optimize the performance of the system 100 without requiring a high consumption of resources. Moreover, multiple releases and nodes may be supported without large increments of development, also reducing the impact to the system 100. Further, the identification of loaded configuration data can be straightforward since checkpoint files can be used for this purpose. In addition, the checkpoint files need not be generated during data collection, which reduces the overhead on the system 100 as well as any tools used for developing a data change management system.

The system 100 described here enables data extraction from propriety systems, and minimal time may be needed for data extraction since binary data contained in checkpoint files is parsed (instead of textual data that is often contained in secondary files created with special utilities available in conventional parsers). Stale data may be avoided by triggering a backup of the data every time a TPS parser is run to develop a configuration report. The data backups can be in binary format, which is created in a checkpoint file in a relatively shorter time compared to generating secondary files in the text format. Generating the secondary files in the text format takes a much longer time and loads all data owners for that period of time. Hence, the data backup impact on the system 100 can be reduced or minimized. Further, the available checkpoint files from the complete network can be parsed to provide a comprehensive configuration and interconnection report. In addition, the system 100 may include auto-check pointing that enables a copy of the latest checkpoint to be available anytime. Finally, the checkpoint operations may be scheduled such a way as to not collide with other background operations running on the system 100.

In the following discussion, it may be assumed that this functionality is executed using the GUS 116 and that checkpoint files or other data is stored in the PHD 118. However, this is for illustration and explanation only. The configuration data discovery functionality described in this patent document could be implemented using any suitable device(s) and operate using data from any suitable source(s).

Although FIG. 1 illustrates one example of a TPS system 100, various changes may be made to FIG. 1. For example, various components in FIG. 1 (such as any of the nodes 114-134) could be combined, further subdivided, rearranged, or omitted and additional components could be added according to particular needs. Also, while FIG. 1 illustrates one example operational environment in which configuration data discovery functionality can be used, this functionality could be used in any other suitable system.

Figure 2:
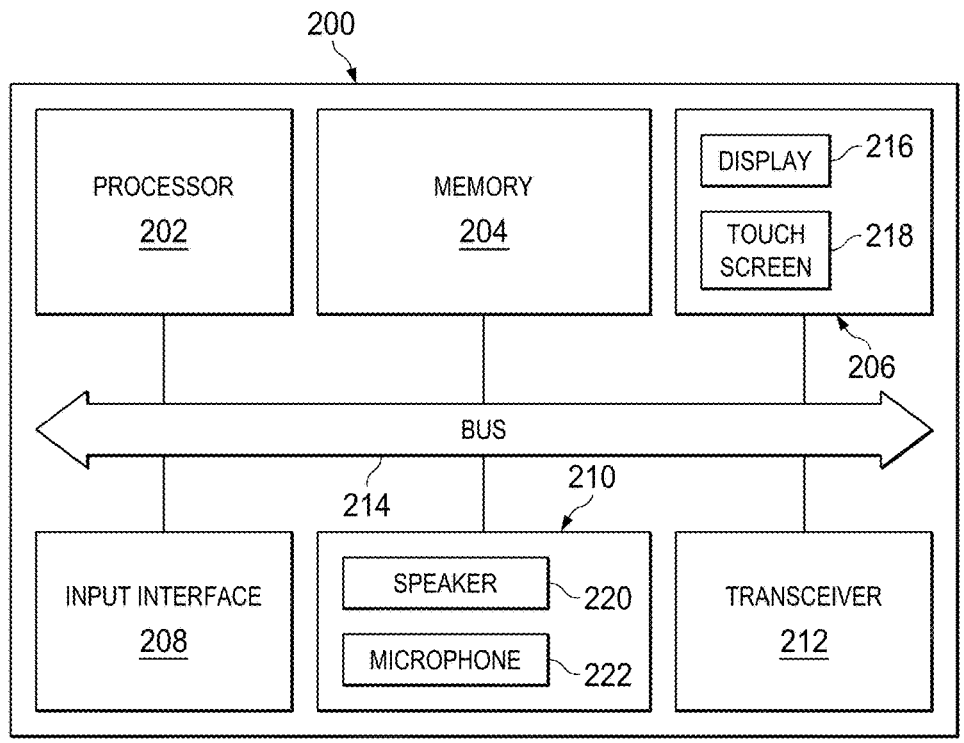
FIG. 2 illustrates an example TPS user interface according to this disclosure.

FIG. 2 illustrates an example TPS user interface 200 according to this disclosure. In particular, FIG. 2 illustrates an example TPS user interface 200 for use in a system to discover the configuration of a legacy control system. The TPS user interface 200 here could represent a suitable component shown in FIG. 1 (such as the GUS 116), although the TPS user interface 200 could denote any other suitable component in the system 100 or other system containing a legacy control system.

As shown in FIG. 2, the TPS user interface 200 includes at least one processor 202 and at least one memory 204. The processors 202 generally operate to process data and control the overall operation of the TPS user interface 200. Each processor 202 denotes any suitable processing device, such as a microprocessor, microcontroller, digital signal processor, central processing unit (CPU), application processor (AP), communication processor (CP), field programmable gate array, application specific integrated circuit, or discrete logic devices. Each memory 204 is used to store and facilitate retrieval of instructions and data used, generated, or collected by the TPS user interface 200. Each memory 204 includes any suitable volatile or non-volatile memory device.

The TPS user interface 200 also includes or supports at least one display device 206. The display devices 206 can be used to present information to a user and optionally to receive input from a user. For example, the display devices 206 could include a display 216 and a touch screen 218 (which could be integrated into a single touch screen display). The display 216 could present a GUI that permits a user to interact with the TPS user interface 200 and any software or programs being executed on the TPS user interface 200 or on another TPS node. The touch screen 218 may capture user input when a user taps, slides, or otherwise touches the touch screen 218.

In addition, the TPS user interface 200 includes at least one input interface 208, at least one audio device 210, at least one transceiver 212, and at least one bus 214. The input interfaces 208 support the receipt of data from one or more input devices in any suitable manner. For example, an input interface 208 could receive input from a keyboard, a keypad, a mouse, an electronic pen or stylus configured to interact with the display devices 206, or a touch pad. The audio devices 210 may include at least one speaker 220 for presenting audio content and at least one microphone 222 for capturing audio signals.

The transceivers 212 can communicate data to or from the TPS user interface 200 in any suitable manner. As noted above, any suitable communication protocol(s) could be supported by the transceiver(s) 212, such as cellular, WIFI, BLUETOOTH, ETHERNET, or any other or additional wireless or wired protocols. The transceivers 212 can support the transmission and reception of any suitable data. For example, as will be described below, various nodes in the system 100 can transmit configuration data to the TPS user interface 200. The transceiver 212 could also transmit data generated via voice recognition or manual entry.

Each bus 214 denotes any suitable communication bus that interconnects and delivers data or other signals between components 202-212. While one bus 214 is shown here, different buses 214 could couple different components in the node 200, or components could be coupled directly together without the need for a shared bus.

Although FIG. 2 illustrates one example of a TPS user interface 200, various changes may be made to FIG. 2. For example, various components in FIG. 2 could be combined, further subdivided, rearranged, or omitted and additional components could be added according to particular needs. Also, computing devices come in a wide variety of configurations, and FIG. 2 does not limit this disclosure to any particular computing devices.

Figure 3:
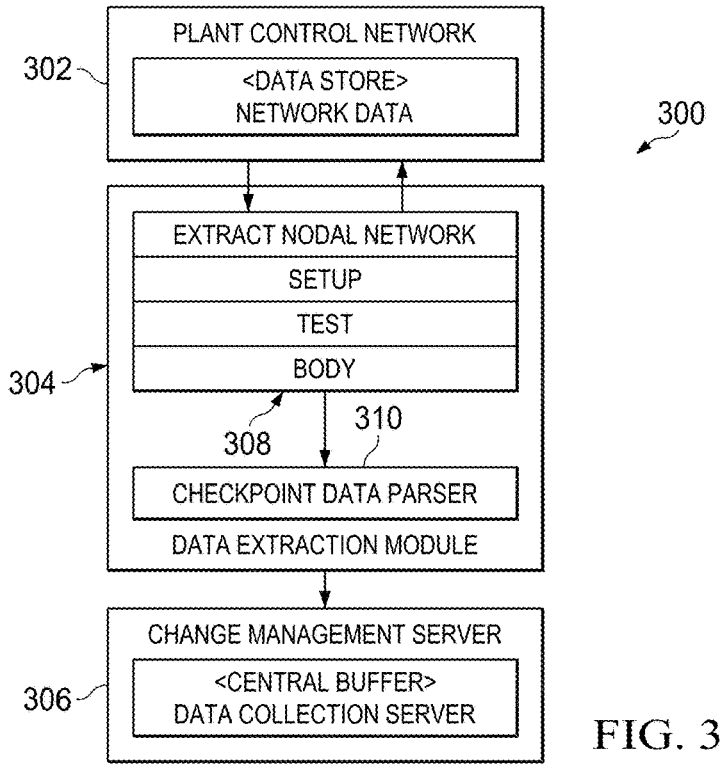
FIG. 3 illustrates an example data extraction system according to this disclosure.

FIG. 3 illustrates an example data extraction system 300 according to this disclosure. The data extraction system 300 could, for example, be implemented within the GUS 116 in FIG. 1 using the structure of the TPS user interface 200 shown in FIG. 2. However, the data extraction system 300 could be used by any other suitable device and in any other suitable system.

As shown in FIG. 3, the data extraction system 300 interacts with a PCN 302 using at least one data extraction module 304. The data extraction module 304 communicates with TPS client nodes or TPS server nodes in the PCN 302 in order to obtain configuration data from those nodes. The data extraction module 304 also processes the obtained data, such as by parsing checkpoint files to extract data from the checkpoint files. In addition, the data extraction module 304 interacts with a change management server 306, which generates information for plant maintenance using the extracted data.

In FIG. 3, the data extraction module 304 includes one or more extraction modules 308 and one or more checkpoint data parsers 310. Each extraction module 308 represents an application that may be used to identify nodes that include configuration data (such as nodes in the PCN 302). For example, an extraction module 308 can identify all nodes that include checkpoint files and identify default locations of the checkpoint files in those nodes. As a particular example, various nodes 108-134 in FIG. 1 may each include one or more checkpoint files that represent a collection of configuration data. The checkpoint files may be used for back-building configuration data in cases of system failures. The extraction module 308 can use this obtained information to build a comprehensive network diagram that facilitates operations of the checkpoint data parsers 310.

Each checkpoint data parser 310 represents an application that retrieves node data and checkpoint locations from the extraction module(s) 308 and that parses the data to extract specific information. Each checkpoint data parser 310 may be designed for one type of TPS node or for multiple types of TPS nodes. Parsed data from the checkpoint data parsers 310 is provided to a data collection server of the change management server 306, which builds a comprehensive report of the configuration data.

Each extraction module 308 includes any suitable hardware or combination of hardware and software/firmware instructions for extracting configuration data from one or more legacy control systems. Each data parser 310 includes any suitable hardware or combination of hardware and software/firmware instructions for parsing extracted data to obtain specific configuration information for one or more legacy control systems. The change management server 306 includes any suitable hardware or combination of hardware and software/firmware instructions for storing or using legacy control system configuration data.

Although FIG. 3 illustrates one example of a data extraction system 300, various changes may be made to FIG. 3. For example, various components in FIG. 3 could be combined, further subdivided, rearranged, or omitted and additional components could be added according to particular needs. Also, any other suitable system could be used to extract data from legacy control systems.

Figure 4:
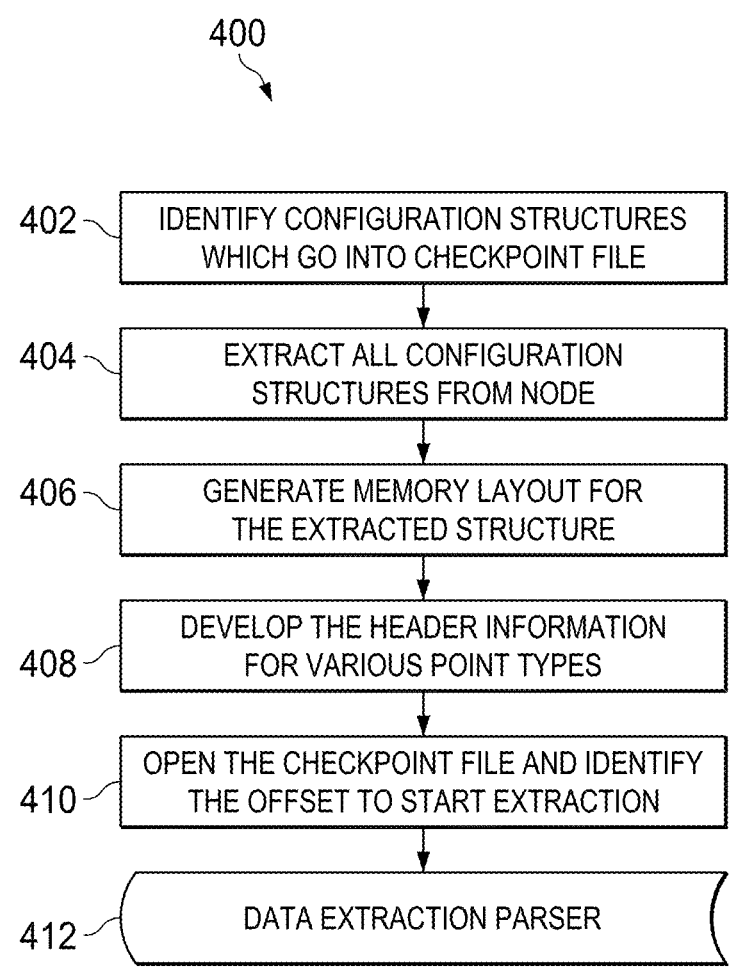
FIG. 4 illustrates an example method for obtaining and processing checkpoint files according to this disclosure.

FIG. 4 illustrates an example method 400 for obtaining and processing checkpoint files according to this disclosure. For ease of explanation, the method 400 is described with respect to the data extraction system 300 of FIG. 3 operating with the TPS user interface 200 of FIG. 2 within the system 100 of FIG. 1. However, the method 400 could be performed by any other suitable device and in any other suitable system.

As shown in FIG. 4, configuration records that belong in a checkpoint file for a node are identified at step 402, and configuration data is extracted from the node based on the identified configuration records at step 404. A memory layout is generated from the configuration data for the node at step 406, and header information for various point types are generated at step 408. The header information could, for example, be generated by identifying a node number of the node and the internal entity identification (ID) of each soft point. A soft point may represent a measurable parameter or specific configuration data point of the node.

The checkpoint file for the node is opened in a binary file reader, and the offset in the checkpoint file is identified for each I/O soft point followed by the node-specific configuration at step 410. In a checkpoint file, the I/O configuration data may generally be available at the top of the checkpoint file. Below the I/O configuration data is often node configuration data that can define the header position for each soft point type in a particular node. The checkpoint file is parsed at step 412. For example, for each soft point, the header (which includes the node number being parsed for configuration data) and the internal entity ID of the soft point is identified.

At this point, the parsed/extracted data can be used in any suitable manner. For example, as described above, the parsed/extracted data can be provided to the change management server 306, which can use the data to identify changes in the configuration data of the node. Note that the method 300 could be performed repeatedly for the same node to identify changes in the node's configuration over time. Also note that the method 300 could be performed repeatedly for different nodes to identify multiple nodes' configurations and changes to those configurations over time.

Although FIG. 4 illustrates one example of a method 400 for obtaining and processing checkpoint files, various changes may be made to FIG. 4. For example, while shown as a series of steps, various steps in FIG. 4 could overlap, occur in parallel, or occur any number of times.

Figure 5:
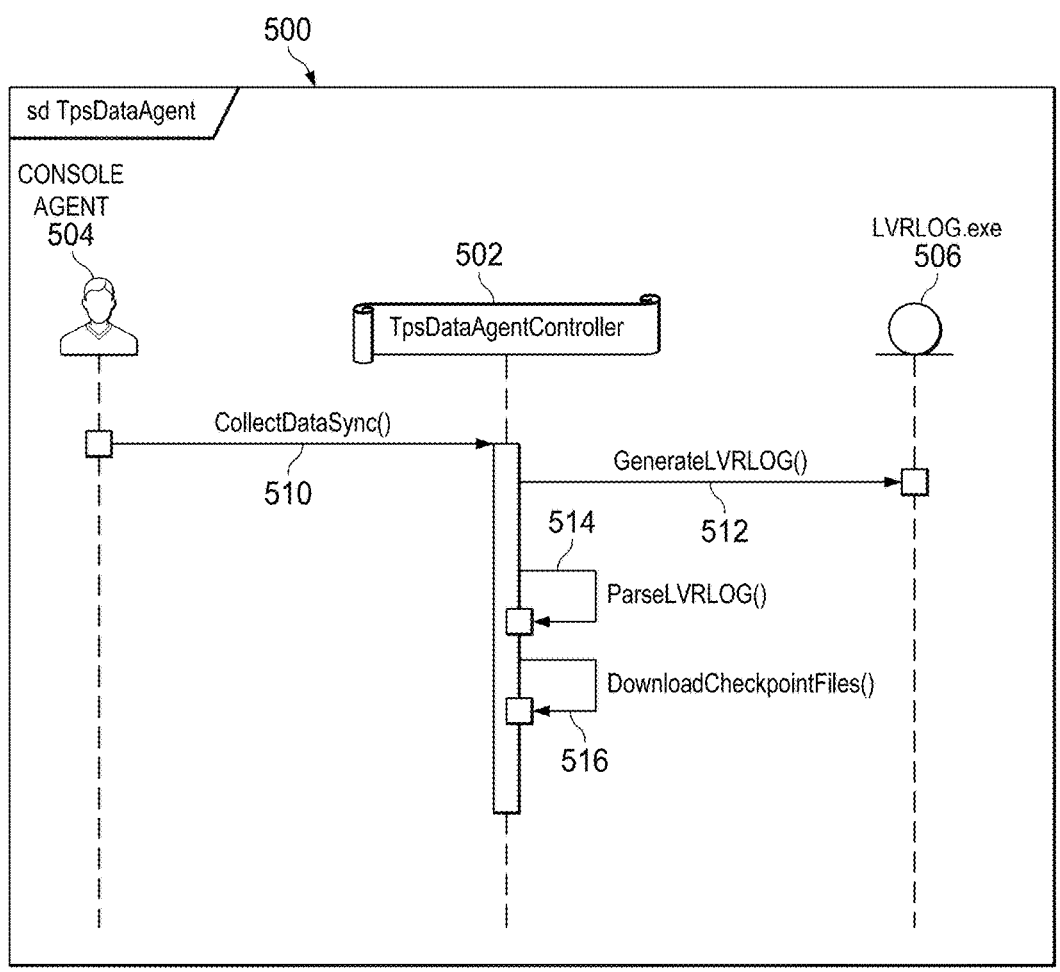
FIG. 5 illustrates an example TPS agent according to the disclosure.
Figure 6:
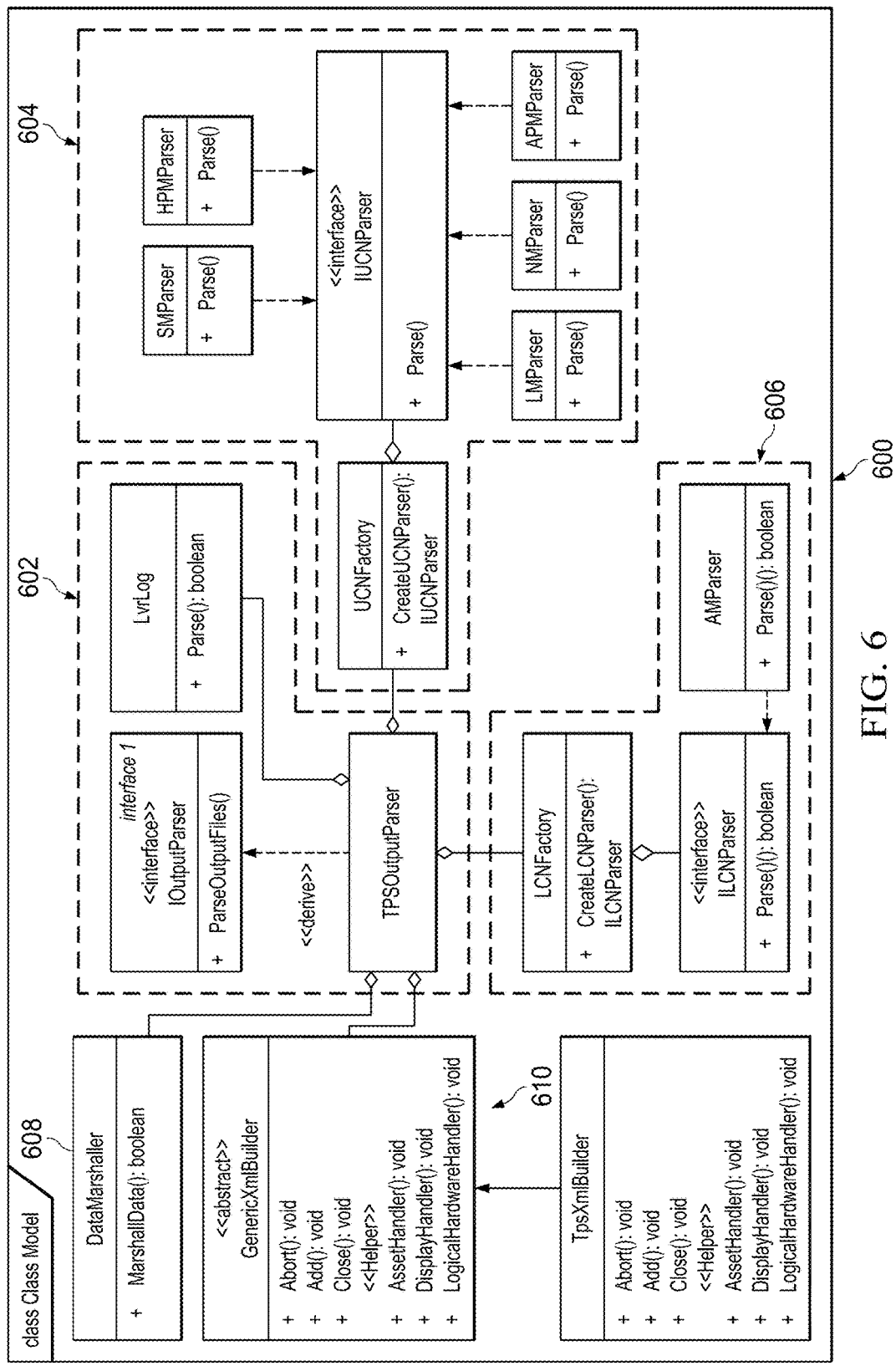
FIG. 6 illustrates an example TPS parser according to the disclosure.
Figure 8:
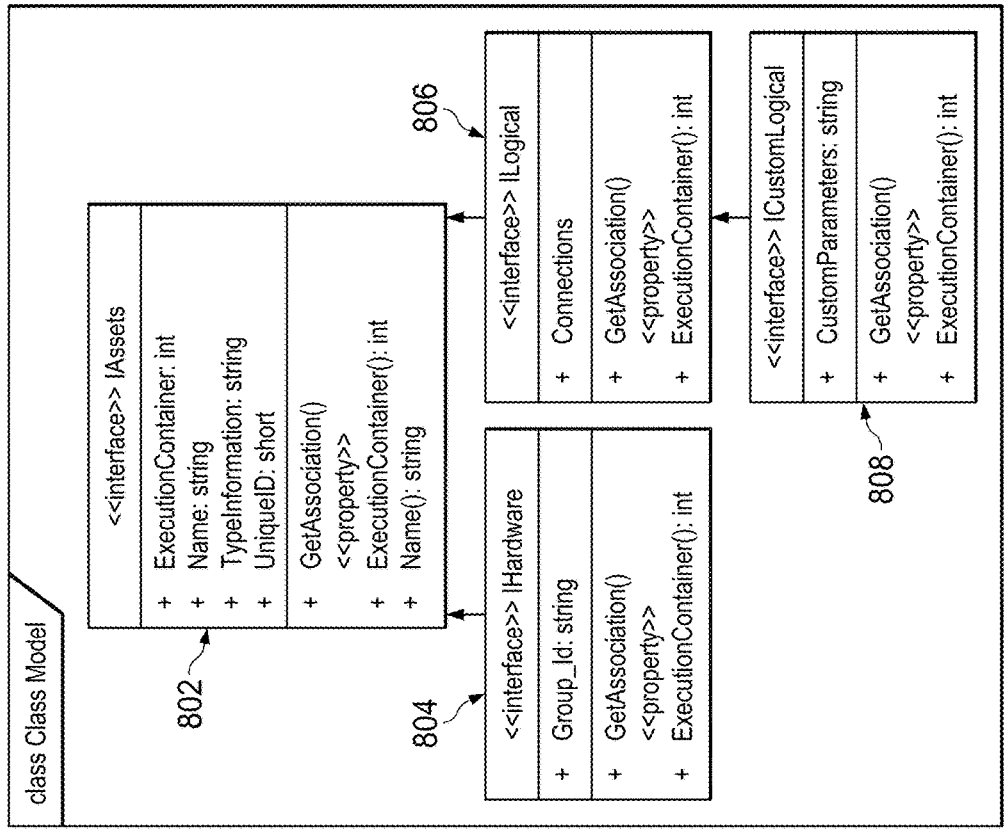
FIGS. 7 and 8 illustrate an example TPS data agent according to the disclosure.
Figure 7:
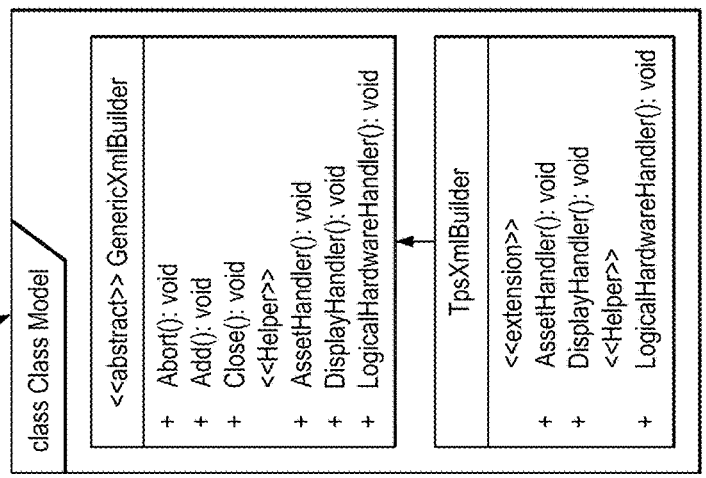

FIGS. 5 through 8 illustrate example components that could be used to implement the data extraction module 304 of FIG. 3. Specifically, FIG. 5 illustrates an example TPS agent according to the disclosure, FIG. 6 illustrates an example TPS parser according to the disclosure, and FIGS. 7 and 8 illustrate an example TPS data agent according to the disclosure. For ease of explanation, the components of FIGS. 5 through 8 are described with respect to the TPS user interface 200 of FIG. 2 operating in the system 100 of FIG. 1. However, the components of FIGS. 5 through 8 could be used in any other suitable device and in any other suitable system.

As shown in FIG. 5, a TPS agent 500 includes a TPS agent controller 502, which interacts with an agent 504 and a log generator 506. The TPS agent controller 502 generally controls the operation of the TPS agent 500 in order to identify the nodes of a system that may contain configuration data to be collected. The TPS agent controller 502 can receive data from the agent 504 during an operation 510, such as by receiving a request from the agent 504 to initiate a data collection. The request from the agent 504 can be received in any suitable manner, such as by receiving the request from the agent's device via a web browser or application interface.

The TPS agent controller 502 sends a command to the log generator 506 during an operation 512. The log generator 506 denotes an application that can generate a logging file that defines a comprehensive network diagram of nodes connected to a network, such as by identifying all nodes coupled to a TPS network. For example, the log generator 506 could denote the LCN Version/Revision Logging Tool (LVRLOG) available from HONEYWELL INTERNATIONAL INC. The TPS agent controller 502 can then call other components (described below) that (i) parse the logging file during an operation 514 to identify the nodes in the system and their associated checkpoint files and (ii) download the checkpoint files from the identified nodes during an operation 516.

The TPS agent 500 can be implemented in any suitable manner. For example, the TPS agent 500 includes any suitable hardware or combination of hardware and software/firmware instructions for identifying nodes and obtaining checkpoint files from those nodes. As a particular example, the TPS agent 500 could represent one or more applications installed on the memory 204 and executed by the processor 202 of the TPS user interface 200 (which could denote the GUS 116 of FIG. 1). However, the TPS agent 500 could be used with any other suitable device(s).

As shown in FIG. 6, a TPS parser 600 represents an application that may parse the logging file generated as described above to determine a list of nodes. The TPS parser 600 may also parse the checkpoint files for those nodes (possibly in parallel) to extract configuration data in binary format for those nodes. In FIG. 6, the TPS parser 600 includes log modules 602 that parse the logging file from the TPS agent controller 502 to identify the list of nodes that are present, such as the nodes coupled to a TPS network. The TPS parser 600 also includes UCN factory modules 604, which parse checkpoint files from various nodes like the fail-safe controller 130, logic manager 132, process manager 134, and any other node connected to the NIM 126. The TPS parser 600 further includes local control network (LCN) factory modules 606, which parse checkpoint files from various nodes like the application module 122, gateways 128, and any other node connected to an LCN.

A data marshaller module 608 represents a library that can be used by the log modules 602 to parse binary checkpoint files automatically. TPS data agent modules 610 represent libraries that may be used to generate different extensible markup language (XML) files based on specified requirements. The log modules 602 can use the outputs from the UCN factory modules 604, LCN factory modules 606, and the data marshaller module 608, in combination with the logging file, to parse the checkpoint files and generate parsed data outputs. The parsed data outputs can be placed into XML file format(s) as defined by the TPS data agent modules 610.

As shown in FIGS. 7 and 8, the TPS data agent modules 610 denote one or more applications that generate XML files, which can be used to provide configuration data to one or more users or to store the configuration data. As a particular example, the TPS data agent modules 610 could be used to provide configuration data that is displayed on the display 206 of a TPS user interface 200 (such as the GUS 116).

The XML file(s) that may be created by the TPS data agent modules 610 could include asset blocks, channels, hardware associations, hardware instance parameters, logical associations, logical connections, logical instance parameters, type parameters, and types of nodes. The TPS data agent modules 610 shown in FIG. 7 categorize all soft points from identified nodes based on categories 802-808 shown in FIG. 8. Although FIG. 8 illustrates four categories, any number of categories may be used based on a user's requirements.

As shown in FIG. 8, the four classes or categories include assets 802, hardware 804, logical connections 806, and custom logical connections 808. The category related to assets 802 categorizes objects based on details regarding nodes and the locations of the nodes. The category related to hardware 804 categorizes all hardware-related nodes and their properties and can include nodes such as the nodes 114-134. The category related to logical connections 806 categorizes all logical soft points, such as analog inputs, analog outputs, digital inputs, digital outputs, timer data points, and logic data points. The category related to custom logical connections 808 may categorize custom soft points, such as custom parameters like switch algorithms, regulatory points, or control algorithms stored in the APP 114 or the AM 122.

Turning back to FIG. 6, the data marshaller module 608 updates data into object parameters defined by the categories of FIG. 8. In some embodiments, this is done based on the following attributes:

1. FIELDINFO (OFFSET, BYTELENGTH)—where OFFSET is the starting byte offset and BYTELENGTH is the number of bytes;
2. BITFIELDINFO (OFFSET, BITSTARTINGOFFSET, BITLENGTH)—where OFFSET is the starting byte offset, BITSTARTINGOFFSET is the starting bit offset, and BITLENGTH is the number of bits; and
3. MARSHALLDATAAS (MARSHALLTYPE, MARSHALL SUBTYPE)—where MARSHALLTYPE and MARSHALLSUBTYPE refer to the type of data being marshalled.

Although FIGS. 5 through 8 illustrate examples of components that could be used to implement a data extraction module 304, various changes may be made to FIGS. 5 through 8. For example, various components in each figure could be combined, further subdivided, rearranged, or omitted and additional components could be added according to particular needs. Also, the data extraction module 304 could be implemented in any other suitable manner.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system comprising:
    at least one processor configured to:
        identify multiple nodes coupled to at least one network of an industrial plant,
        wherein each node includes one or more checkpoint files that represent a collection of configuration data;
        generating a memory layout from the configuration data for the node;
        obtain configuration data from each of the nodes;
        generate header information by identifying a node number of the node and an internal entity identification;
        access the checkpoint file of the node and identifying the offset in said checkpoint file to generate a node specific configuration;
        parse the configuration data to extract specified information from the configuration data; and
        store the extracted specified information in a specified format.

2. The system of claim 1, wherein, to parse the configuration data for each node, the at least one processor is configured to:
    generate a memory layout for the configuration data from the node;
    open a checkpoint file containing the configuration data from the node; and
    identify at least one point and header information for the at least one point in the checkpoint file using the memory layout.

3. The system of claim 2, wherein the header information for each node comprises:
    a node number for the node; and
    an internal entity identification (ID) of the at least one point for the node.

4. The system of claim 1, wherein, to identify the multiple nodes, the at least one processor is configured to:
generate a network diagram of the nodes coupled to the at least one network; and
identify the nodes from the network diagram.

5. The system of claim 1, wherein the at least one processor is configured to store the extracted specified information in an extensible markup language (XML) format.

6. The system of claim 1, wherein the configuration data is obtained in a binary format.

7. The system of claim 1, wherein the at least one processor is further configured to display the extracted specified information.

8. A method comprising:
identifying multiple nodes coupled to at least one network of an industrial plant wherein each node includes one or more checkpoint files that represent a collection of configuration data;
generating a memory layout from the configuration data for the node;
obtain configuration data from each of the nodes;
generating header information by identifying a node number of the node and an internal entity identification;
accessing the checkpoint file of the node and identifying the offset in said checkpoint file to generate a node specific configuration;
parsing the configuration data to extract specified information from the configuration data; and
storing the extracted specified information in a specified format.

9. The method of claim 8, wherein parsing the configuration data for each node comprises:
generating a memory layout for the configuration data from the node;
opening a checkpoint file containing the configuration data from the node; and
identifying at least one point and header information for the at least one point in the checkpoint file using the memory layout.

10. The method of claim 9, wherein the header information for each node comprises:
a node number for the node; and
an internal entity identification (ID) of the at least one point for the node.

11. The method of claim 8, wherein identifying the multiple nodes comprises:
generating a network diagram of the nodes coupled to the at least one network; and
identify the nodes from the network diagram.

12. The method of claim 8, wherein the extracted specified information is stored in an extensible markup language (XML) format.

13. The method of claim 8, wherein the configuration data is obtained in a binary format.

14. The method of claim 8, further comprising:
displaying the extracted specified information.

15. A non-transitory computer readable medium containing instructions that, when executed by at least one processing device, cause the at least one processing device to:
identify multiple nodes coupled to at least one network of an industrial plant, wherein each node includes one or more checkpoint files that represent a collection of configuration data;
generating a memory layout from the configuration data for the node;
obtain configuration data from each of the nodes;
generate header information by identifying a node number of the node and an internal entity identification;
access the checkpoint file of the node and identifying the offset in said checkpoint file to generate a node specific configuration;
parse the configuration data to extract specified information from the configuration data; and
store the extracted specified information in a specified format.

16. The non-transitory computer readable medium of claim 15, wherein the instructions that when executed cause the at least one processing device to parse the configuration data for each node comprise:
instructions that when executed cause the at least one processing device to:
generate a memory layout for the configuration data from the node;
open a checkpoint file containing the configuration data from the node; and
identify at least one point and header information for the at least one point in the checkpoint file using the memory layout.

17. The non-transitory computer readable medium of claim 16, wherein the header information for each node comprises:
a node number for the node; and
an internal entity identification (ID) of the at least one point for the node.

18. The non-transitory computer readable medium of claim 15, wherein the instructions that when executed cause the at least one processing device to identify the multiple nodes comprise:
instructions that when executed cause the at least one processing device to:
generate a network diagram of the nodes coupled to the at least one network; and
identify the nodes from the network diagram.

19. The non-transitory computer readable medium of claim 15, wherein:
the configuration data is obtained in a binary format; and
the extracted specified information is stored in an extensible markup language (XML) format.

20. The non-transitory computer readable medium of claim 15, further containing instructions that when executed cause the at least one processing device to:
display the extracted specified information.

* * * * *